United States Patent
Sigaev et al.

(10) Patent No.: US 11,269,523 B2
(45) Date of Patent: Mar. 8, 2022

(54) DATA STORAGE SYSTEM POWER MANAGEMENT

(71) Applicant: YADRO INTERNATIONAL LTD., Nicosia (CY)

(72) Inventors: Alexey Sigaev, Moscow (RU); Ivan Tchoub, St.Petersburg (RU); Artem Ikoev, Moscow (RU); Ivan Sutyrin, Krasnogorsk (RU); Anton Smolensky, Krasnogorsk (RU); Boris Popov, Moscow (RU)

(73) Assignee: YADRO INTERNATIONAL LTD., Paphos (CY)

(*) Notice: Subject to any disclaimer, the term of this patent is extended or adjusted under 35 U.S.C. 154(b) by 335 days.

(21) Appl. No.: 16/667,003

(22) Filed: Oct. 29, 2019

(65) Prior Publication Data
US 2021/0124505 A1  Apr. 29, 2021

(51) Int. Cl.
| G06F 3/00 | (2006.01) |
| G06F 3/06 | (2006.01) |
| G06F 11/30 | (2006.01) |
| G06F 1/3234 | (2019.01) |
| G06F 1/28 | (2006.01) |

(52) U.S. Cl.
CPC .............. *G06F 3/0625* (2013.01); *G06F 1/28* (2013.01); *G06F 1/3268* (2013.01); *G06F 3/0634* (2013.01); *G06F 3/0653* (2013.01); *G06F 3/0683* (2013.01); *G06F 11/3058* (2013.01)

(58) Field of Classification Search
None
See application file for complete search history.

(56) References Cited

U.S. PATENT DOCUMENTS

| 7,234,074 | B2 | 6/2007 | Cohn et al. |
| 9,360,925 | B2 | 6/2016 | Slik |
| 9,712,897 | B2* | 7/2017 | Hirata .................. G06F 13/4247 |
| 11,023,404 | B2* | 6/2021 | Kawabe .................. G06F 1/329 |
| 2008/0201588 | A1* | 8/2008 | Pyeon .................... G11C 19/00 713/320 |
| 2009/0189774 | A1 | 7/2009 | Brundridge et al. |

(Continued)

OTHER PUBLICATIONS

Office Action with regard to the counterpart U.S. Appl. No. 16/666,983 dated May 7, 2021.

*Primary Examiner* — Midys Rojas
(74) *Attorney, Agent, or Firm* — BCF LLP

(57) ABSTRACT

There is provided a data storage system comprising a power supply module, a plurality of serially connected storage enclosures, where a first storage enclosure of the plurality of serially connected storage enclosures is connected to the power supply module, and a power management module connected to the power supply module. A given storage enclosure includes at least one disk storage. The power management module is configured to selectively cause the power supply module to provide electric power to activate the first storage enclosure. The power management module is further configured to selectively cause the power supply module to provide electric power to activate a second storage enclosure, where the second storage enclosure is connected downstream from the first storage enclosure, and the second storage enclosure is configured to selectively receive power from the power supply module in response to the first storage enclosure being active.

20 Claims, 5 Drawing Sheets

(56) References Cited

U.S. PATENT DOCUMENTS

2012/0151273 A1 6/2012 Ben et al.
2015/0212910 A1 7/2015 Gondi et al.
2021/0109664 A1 4/2021 Shang et al.

* cited by examiner

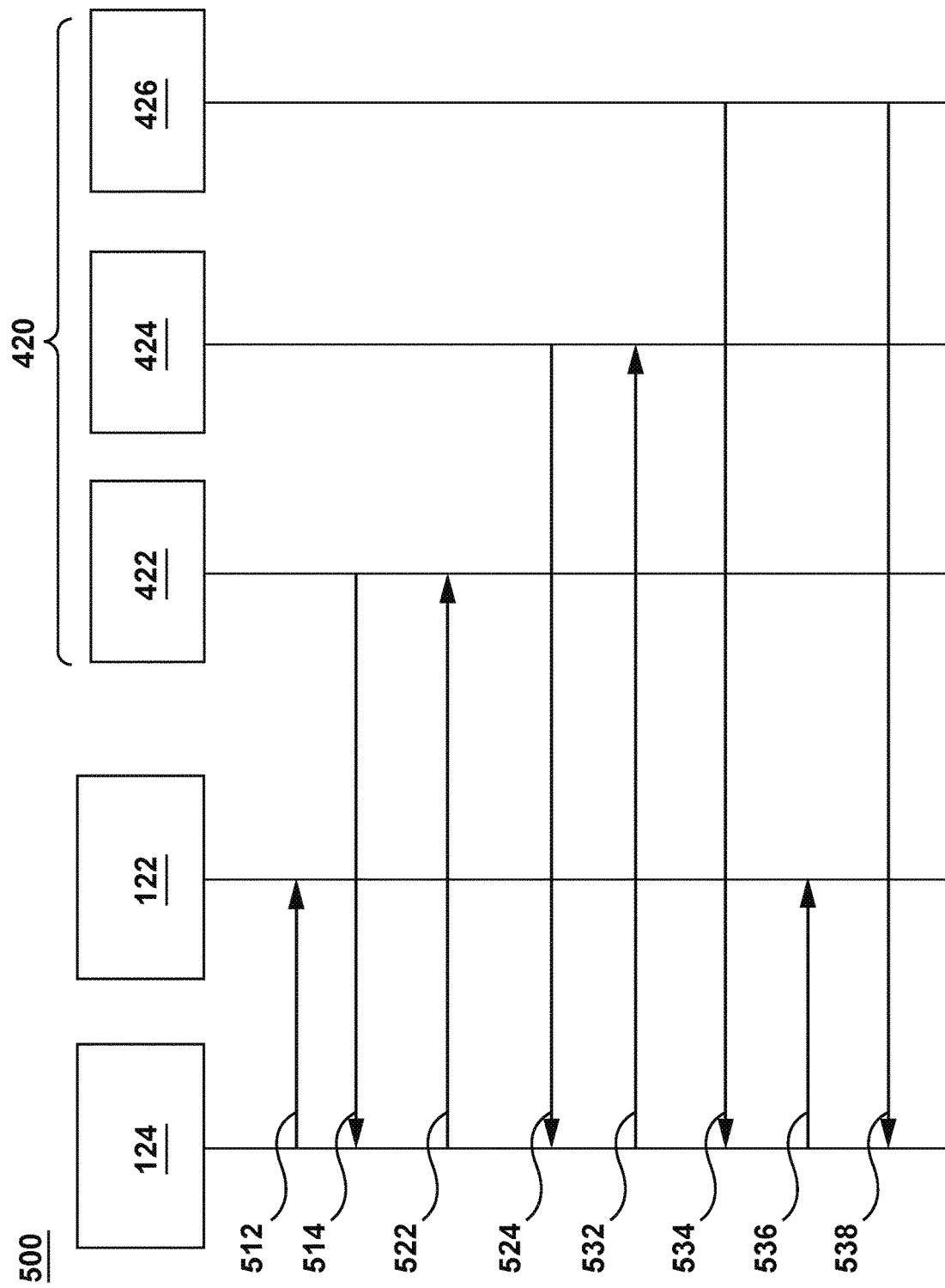

DATA STORAGE SYSTEM POWER MANAGEMENT

FIELD

The present technology relates to data storage systems in general and specifically to power management of a data storage system that includes a plurality of storage enclosures.

BACKGROUND

Object-based storage systems are often used for archiving purposes. As such they can comprise billions, and sometimes trillions of digital objects stored therein. Enterprise high-capacity disk drives are used for storing large volumes of data, as they provide low cost per stored gigabyte of data, while also allowing reasonably fast data retrieval.

When disk-based archive storage systems are scaled to dozens of petabytes and more, factors such as the type of the storage media used, power consumption of the storage system, and physical space occupied by the data storage system contribute to the total cost of ownership (TCO) of the data storage system.

Generally speaking, disk-based storage systems available on the market keep an entirety of their disks powered-on all the time, unless the system is physically detached from the power supplies, or powered-off as a whole. However, in such cases, the system becomes unavailable for client access, and internal data integrity checks (if any).

U.S. Pat. No. 9,360,925 B2 entitled "Power switching technique for archival data storage enclosure", granted on Jun. 7, 2016 and assigned to NetApp Inc. teaches a method of power management of a multiple-data-storage-devices enclosure. In some non-limiting embodiments, the method includes: receiving a network connection and power from a data connection port detachably coupled to a network cable; identifying a subset of data storage devices within the enclosure to activate; powering off components within the enclosure other than the subset of the data storage devices; for each data storage device in the subset that is not yet powered, activating the data storage device by: monitoring power consumption drawn from the data connection port; identifying a sequence of components associated with the data storage device, wherein the components within the sequence, when powered, together provide access to the data storage device; and powering on each component in the sequence when a previous component in the sequence has reached a steady state power consumption level, wherein when activating the data storage device, power supplied to power on the sequence of the components does not exceed a total power available from the data connection port.

U.S. Pat. No. 7,234,074 B2 entitled "Multiple disk data storage system for reducing power consumption", granted on Jun. 19, 2007 and assigned to International Business Machines Corp teaches a data storage system in which each of a set of disks has a first portion for either popular data or error correction information (parity or Reed-Solomon code symbols) associated with the popular data, and a second portion used for other data. A disk controller connected to the set of disks maintains a first popular data block in the first portion of a first of the set of disks and a second popular data block in the first portion of a second of the set of disks. The system maintains at least two of the disks in an active state. The active disks are selected to insure that any data in the popular data blocks can be determined from data stored in the active disks. An additional disk is maintained in an active state if write access is permitted or if there is an additional popular data block.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Embodiments of the present technology have been developed based on developers' appreciation that a data storage system that is continuously powered-on allows immediate access to data stored therein, which drives the TCO of the data storage system upwards.

Developer(s) of the present technology have appreciated that in some instances, longer delays for accessing data stored in the data storage system could be tolerated, which could in turn reduce the TCO of the data storage system. In such instances, when access to data is infrequent, and where data may not need to be immediately available to clients, disk storages in the data storage system may not always be required to be powered-on, which could drive down the TCO of the data storage system.

Developer(s) have appreciated that there is a need for a "cold archive" data storage system, where disk storages could be selectively powered-on to serve active client requests, which could save power resources. Such an object-based disk storage system could be configured to operate below a power consumption threshold at any given moment in time.

The present technology allows configuring a power consumption budget available to operate a data storage system. The power consumption budget may be lower than a power consumption budget required for simultaneously powering-on all of the storage disks in the data storage system. The power consumption budget of the data storage system ensures that the data storage system does not exceed a predetermined power consumption threshold.

Generally speaking, the data storage system of the present technology can provide power to activate only a portion of all of the disk storages located inside each storage enclosures, thus lowering total power consumption requirements.

Such a data storage system could comprise a single power supply module, a power management module, and a plurality of serially connected storage enclosures. The power management module could selectively cause the power supply module to provide power to a plurality of serially connected storage enclosures, where each storage enclosure includes a respective set of disk storages. The power management module can provide power to activate only a portion of the respective set of disk storages inside each storage enclosure of the plurality of serially connected storage enclosures, thus lowering total power consumption of the data storage system. Such a data storage system could eliminate the need for individual power supply units inside each storage enclosure, which could reduce the system total power consumption, as well as lower heat dissipation inside the storage enclosures. In turn, more real estate could be made available in each storage enclosure for installation of disk storages, in contrast with a similar storage enclosure having an individual power supply unit and a wide air cooling channel for example. Such a data storage system could be more power efficient, provide more disk storage space by having more disk storages per square foot, and thus drive down the TCO of the data storage system, while still providing clients with satisfactory data storage services.

The present technology would result in a lower TCO per terabyte, in comparison to some prior art systems available on the market.

Thus, embodiments of the present technology are directed to power management of a data storage system.

In accordance with a first broad aspect of the present technology, there is provided a data storage system, which comprises: a power supply module; a plurality of serially connected storage enclosures, a given storage enclosure of the plurality of serially connected storage enclosures including at least one disk storage, a first storage enclosure of the plurality of serially connected storage enclosures being connected to the power supply module; a power management module connected to the power supply module, the power management module being configured to selectively cause the power supply module to transmit electric power to activate the first storage enclosure, the power management module being further configured to selectively cause the power supply module to transmit the electric power to activate a second storage enclosure of the plurality of serially connected storage enclosures, the second storage enclosure being connected downstream from the first storage enclosure, the second storage enclosure being configured to selectively receive power from the power supply module in response to the first storage enclosure being active.

In some implementations of the data storage system, the power management module is configured to selectively cause the power supply module to transmit electric power to activate a third storage enclosure of the plurality of serially connected storage enclosures, the third storage enclosure being connected downstream from the second storage enclosure; and wherein the third storage enclosure is configured to selectively receive power from the power supply module in response to the second storage enclosure being active.

In some implementations of the data storage system, the third storage enclosure is connected to the power supply module such that the plurality of serially connected storage enclosures form a loop; wherein the power management module is configured to selectively cause the power supply module to transmit electric power to activate the third storage enclosure; and wherein the second storage enclosure is further configured to selectively receive power from the power supply module in response to the third storage enclosure being active.

In some implementations of the data storage system, the first storage enclosure is configured to selectively receive power from the power supply module via the third storage enclosure in response to a connection failure between the first storage enclosure and the power supply module.

In some implementations of the data storage system, the second storage enclosure is a set of serially connected storage enclosures; the power management module is configured to selectively cause the power supply module to transmit electric power to activate a given storage enclosure of the set of serially connected storage enclosures; the given storage enclosure of the multiple serially connected storage enclosures is configured to selectively receive power from the power supply only in response to a totality of storage enclosures connected between the power supply module and the given storage enclosure of the set of serially connected storage enclosures being active.

In some implementations of the data storage system, the power management module, the power supply module, and the plurality of serially connected storage enclosures are connected via respective power-line cords.

In some implementations of the data storage system, the respective power-line cords include a power control commands channel and an electric power transmission channel.

In some implementations of the data storage system, the power management module, the power supply module, and each of the plurality of serially connected storage enclosures include respective power-line modems for transmitting power control commands on the power control commands channel of the respective power-line cords.

In some implementations of the data storage system, the first storage enclosure is further configured to: transmit the electric power in response to receiving a respective power control command on the power control commands channel from the power management module; and wherein the second storage enclosure is further configured to: transmit the electric power in response to receiving a respective power control command on the power control commands channel from the power management module.

In some implementations of the data storage system, the respective power-line modems of the plurality of serially connected storage enclosures are configured to exclusively transmit responses to power control commands originating from the power-line modem of the power management module.

In some implementations of the data storage system, the respective power-line modems are configured to transmit the responses to power control commands by modulating a voltage.

In some implementations of the data storage system, the power control commands channel is a serial bus on the power-line cords.

In some implementations of the data storage system, the respective power-line cord between the power management module and the power supply module is configured for transmission of power control commands exclusively.

In some implementations of the data storage system, the given storage enclosure of the plurality of serially connected storage enclosures is configured to activate at least one of the least one disk storage upon receiving a power control command from the management module.

In accordance with another broad aspect of the present technology, there is provided a data storage system comprising: a power supply module; a plurality of serially connected storage enclosures, a given storage enclosure of the plurality of serially connected storage enclosures including at least one disk storage, a first storage enclosure of the plurality of serially connected storage enclosures being connected to the power supply module; a power management module connected to the power supply module, the power management module being configured to selectively cause the power supply module to transmit electric power to activate the first storage enclosure, the power management module being further configured to selectively cause the first storage enclosure to transmit the electric power to activate a second storage enclosure of the plurality of serially connected storage enclosures, the second storage enclosure being connected downstream from the first storage enclosure.

In some implementations of the data storage system, the power management module is configured to selectively cause the second storage enclosure to transmit the electric power to activate a third storage enclosure of the plurality of serially connected storage enclosures, the third storage enclosure being connected downstream from the second storage enclosure.

In some implementations of the data storage system, the first storage enclosure can transmit the electric power only if it is active; and wherein the second storage enclosure can transmit the electric power only if is active.

In accordance with another broad aspect of the present technology, there is provided a data storage system comprising: a power supply module, the power supply module including a first output power supply connector; a power management module connected to the power supply module, the power management module being configured to selectively switch the first output power supply connector to cause the power supply module to transmit electric power; and a plurality of serially connected storage enclosures, the plurality of serially connected storage enclosures including: a first storage enclosure connected to the first output power supply connector of the power supply module, the first storage enclosure being configured to transmit the electric power to a given storage enclosure in response to a first request from the power management module; and the given storage enclosure, the given storage enclosure including a respective set of disk storages, the given storage enclosure being connected downstream from the first storage enclosure, the given storage enclosure being configured to transmit the electric power to activate a first disk storage of the set of disk storages in response to a second request from the power management module.

In some implementations of the data storage system, the first storage enclosure is configured to transmit the electric power to a second storage enclosure upon receiving a third request from the power management module; and wherein the second storage enclosure is configured to transmit the electric power to a third storage enclosure upon receiving a fourth request.

In some implementations of the data storage system, the data storage system is connected to a storage processor; and wherein the power management module is configured to selectively switch the first output power supply connector to provide the electric power to the first storage enclosure in response to a request from the storage processor.

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 depicts a schematic diagram of a communication flow of an enclosure discovery procedure in accordance with non-limiting embodiments of the present technology.

DETAILED DESCRIPTION

Figure 1:
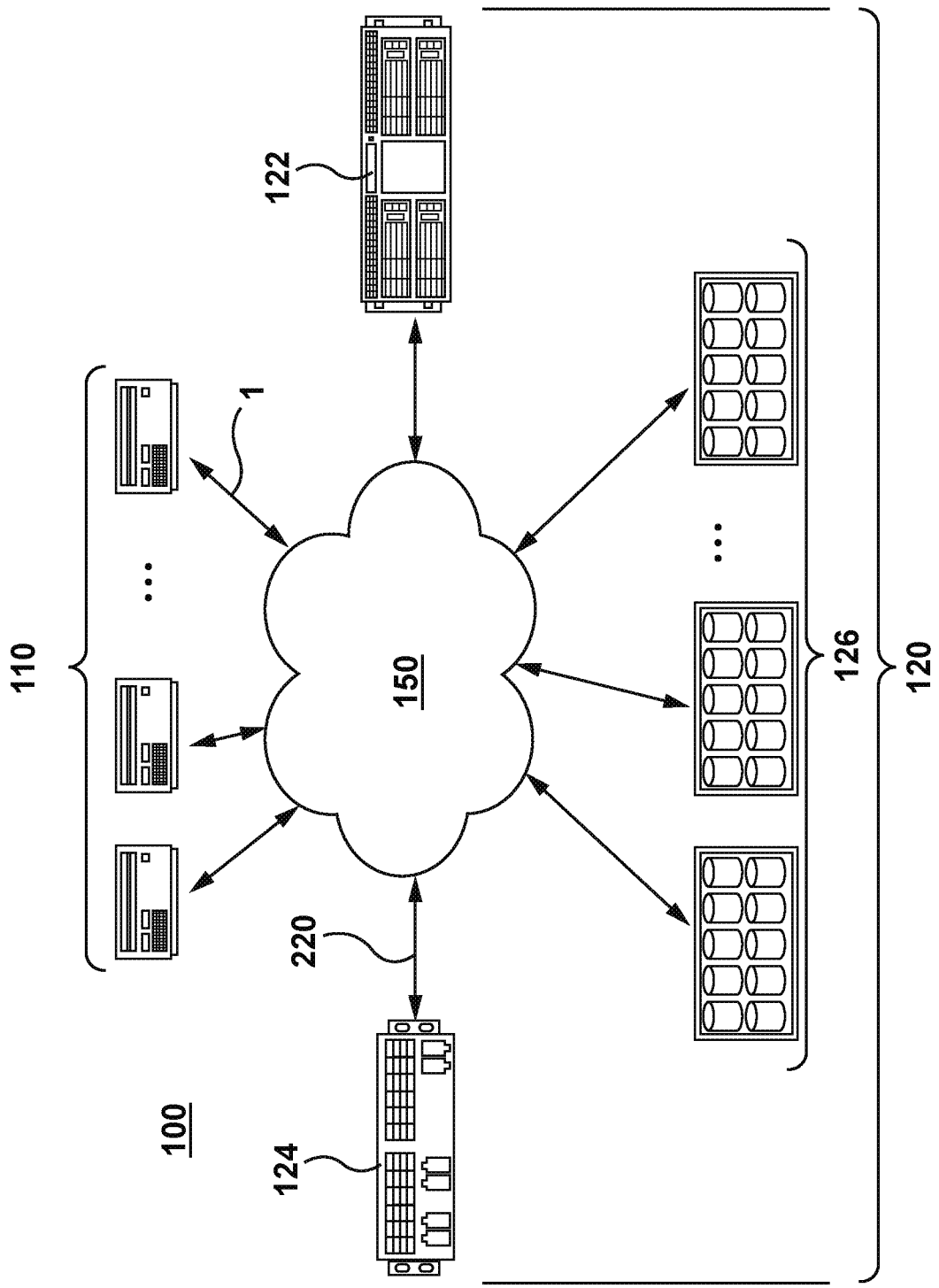
FIG. 1 depicts a schematic diagram of a system in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

System

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured for storing data and retrieving data in response to requests from one or more client devices (not depicted) connected to the system 100 via a client network (not depicted). The nature of the one or more client devices is not limited and, as such, the one or more client devices can include one or more other computer systems, one or more other end client devices, and the like.

Storage Processors

The system 100 comprises one or more storage control processors 110, and a data storage sub-system 120 coupled to a data transfer and management network 150. Broadly speaking, the purpose of the one or more storage control processors 110 is to interface with the client devices (not depicted) of the system 100 and to distribute received tasks to the data storage sub-system 120, which is functionally responsible for executing the received tasks (such as storing data, retrieving data, and the like). Thus, it can be said, that the one or more storage control processors 110 are configured to execute an interface and a controlling functions, while the data storage sub-system 120 comprises the hardware components that are controlled by and implement tasks assigned by the one or more storage control processors 110.

The one or more storage control processors 110 are connected to the one or more client devices (not depicted) via the client network (not depicted), and to the data storage sub-system 120 via the data transfer and management network 150.

The one or more storage control processors 110, also known as storage controllers, and array controllers, are generally electronic devices having a central processing unit (CPU), a cache memory and connection interfaces with the client network and the data storage sub-system 120. In one non-limiting example, the one or more storage control processors 110 can each be implemented as a Dell™ PowerEdge™ Server running the Microsoft™ Windows Server™ operating system, but can also be implemented in any other suitable hardware, software, and/or firmware, or a combination thereof.

The one or more storage control processors 110 are configured to process incoming client requests from the one or more client devices and distribute them to the data storage sub-system 120 for execution thereby. The client requests may include requests to read data, which client requests are executed by a specific disk storage (not depicted in FIG. 1) in the data storage sub-system 120 as controlled by the one or more storage control processors 110, request to write data, which client requests are executed in a specific disk storage in the data storage sub-system 120 as controlled by the one or more storage control processors 110, requests for configuring storage system resources in the data storage sub-system 120 or a combination thereof.

The one or more storage control processors 110 may receive client requests over the client network (not depicted) via client data packets (not depicted). The one or more storage control processors 110 may transmit responses to the client requests over the client network (not depicted) in the form of response data packets (not depicted).

How the one or more storage control processors 110 are implemented is not limited. As a non-limiting example, the one or more storage control processors 110 may be implemented as any suitable off the shelf server, which has been configured and programmed to execute various routines as disclosed in this description. It is also noted that the server may need to be adapted with certain hardware components, as will be described in greater details herein below (such as respective PLC modems discussed above, and the like).

A non-limiting example of the implementation of the one or more storage control processors 110 is SUPERSERVER server available from Super Micro Computer, Inc., 980 Rock Avenue, San Jose, Calif. 95131, United States of America.

It is contemplated that in some non-limiting embodiments of the present technology the one or more storage control processors 110 can receive electrical power from one or more separate power supply units (not depicted).

In alternative non-limiting embodiments of the present technology, the one or more storage control processors 110 may be part of the data storage sub-system 120.

Data Transfer And Management Network

The one or more storage control processors 110 are connected to the data storage sub-system 120 over the data transfer and management network 150.

The data transfer and management network 150 may include one or more networks enabling data transfer between components in the system 100, and management of components by other components in the system 100.

As a non-limiting example, the data transfer and management network 150 may include networks such as the Internet, a wide-area communications network, a local-area communications network, and a private communications network using a variety of communication protocols such as transmission control protocol/internet protocol (TCP/IP), packet over synchronous optical networking/synchronous digital hierarchy (SONET/SDH), multiprotocol label switching (MPLS), asynchronous transfer mode (ATM), Ethernet, and the like. As a result, data may be moved between components of the system 100.

In some non-limiting embodiments of the present technology, the data transfer and management network 150 may be implemented as a single network. As a non-limiting example, a single data transfer and management network 150 may be implemented as a PCI express (PCIe) fabric.

In other non-limiting embodiments of the present technology, the data transfer and management network 150 may be implemented as a plurality of distinct networks.

Data Storage Sub-System

The system 100, including the one or more storage control processors 110 and the data storage sub-system 120, is configured to provide the one or more client devices (not depicted) with data storage services. Generally speaking, the data storage sub-system 120 can be implemented as a cold storage system. A cold storage system is a computer system or mode of operation designed for retention of inactive data on a long-term or indefinite basis.

Non-limiting example of uses of the system 100 include data storage services for providing: media asset workflows, health care information archiving, regularity and compliance archiving, scientific data storage, digital preservation, magnetic tape replacement, and the like.

The data storage sub-system 120 comprises a power supply module 122, a power management module 124, and one or more pluralities of storage enclosures 126 connected over the data transfer and management network 150.

How the data storage sub-system 120 is configured from a power transmission perspective will now be described with reference to FIG. 2 and FIG. 3.

Figure 2:
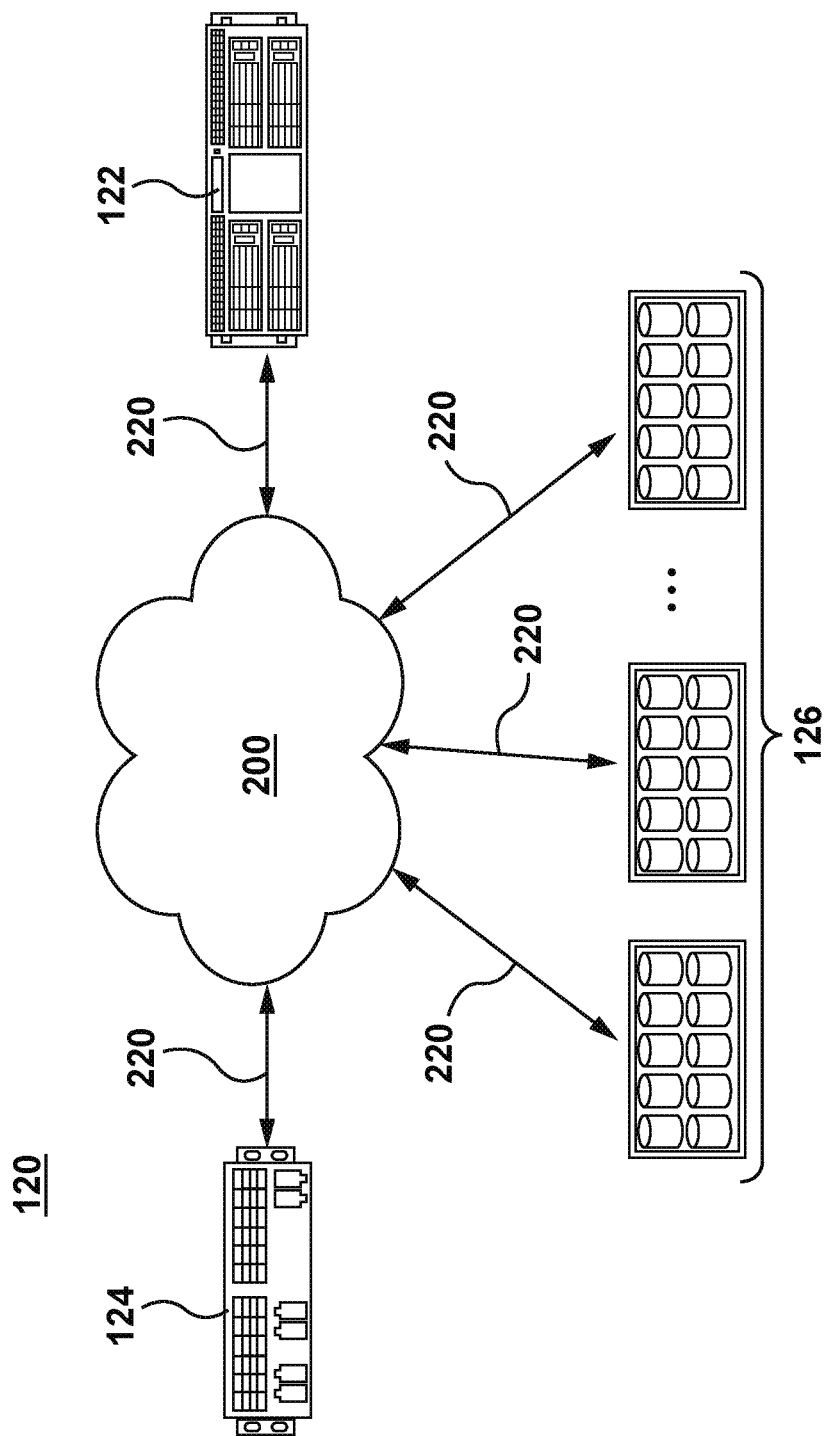
FIGS. 2 and 3 depict a schematic diagram of a power control network within the system of FIG. 1 in accordance with non-limiting embodiments of the present technology.
Figure 3:
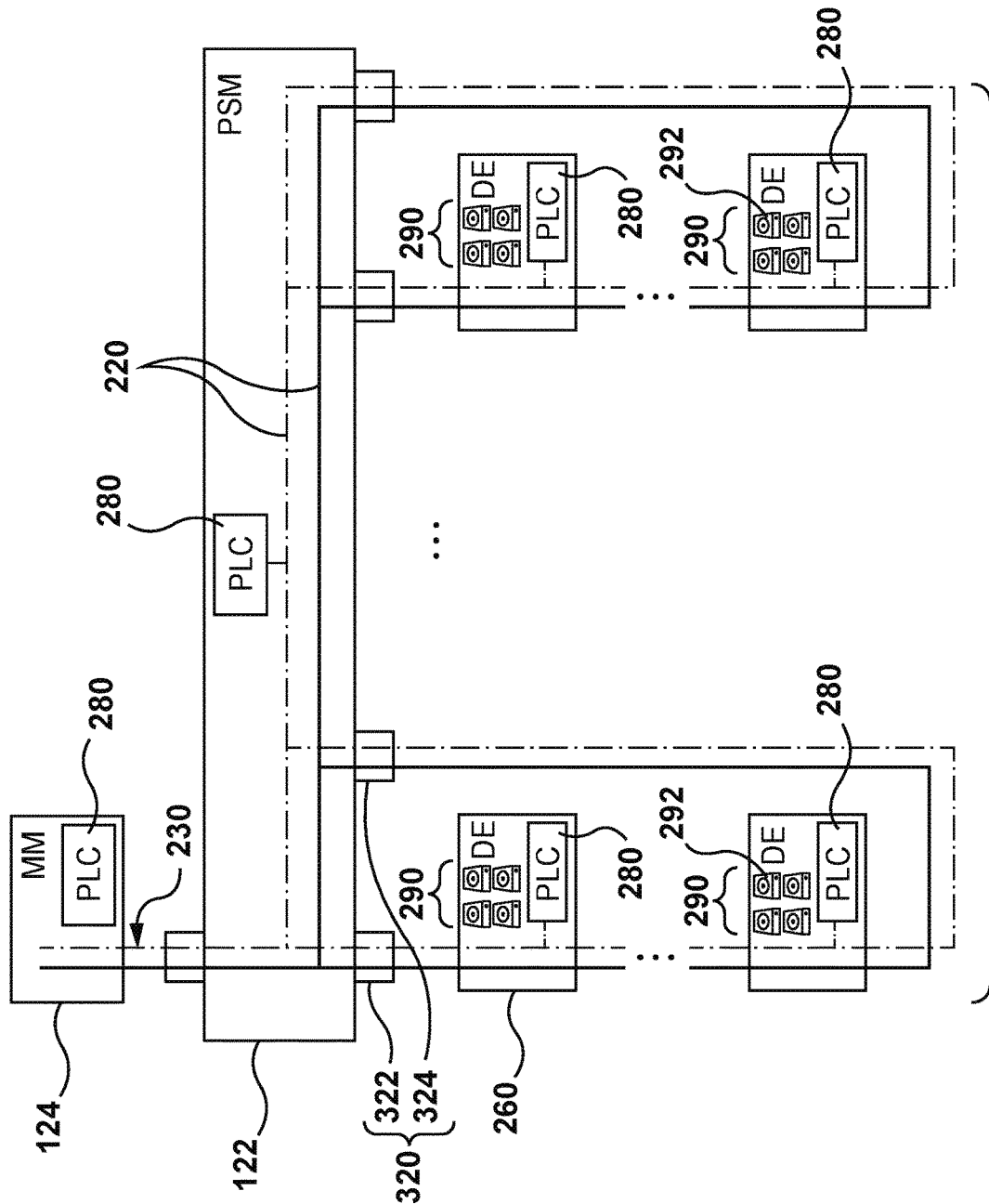

FIG. 2 and FIG. 3 depict, in accordance with non-limiting embodiments of the present technology, a schematic diagram of different components of the data storage sub-system 120 coupled to a power control network 200.

The data storage sub-system 120 comprises the power supply module 122, the power management module 124, and the one or more pluralities of storage enclosures 126 coupled to a power control network 200 via respective power-line cords 220.

Power Control Network

The power control network 200 interconnects each of the power supply module 122, the power management module 124, and each of the one or more pluralities of storage enclosures 126 via the respective power-line cords 220.

The power control network 200 is configured for: (i) transmission of power from the power supply module 122 to the one or more pluralities of storage enclosures 126 via the respective power-line cords 220; and (ii) transmission of power control commands and responses thereto between the power supply module 122, the power management module 124, and the one or more pluralities of storage enclosures 126 via the respective power-line cords 220.

It should be noted that the power control network 200 is physically and logically distinct from other existing networks in the system, such as a wired or wireless network part of the data transfer and management network 150, for example.

The respective power-line cords 220 are configured to transmit both electric power and power control commands via a modulated alternative current (AC) signal. The use of the respective power-line cords 220 for the transmission of both of the electric power and power control commands reduces a number of external cables in the data storage sub-system 120, thereby making maintenance of cables in the data storage sub-system 120 simpler and potentially more cost-effective. It is contemplated that in at least some non-limiting embodiments of the present technology, the use of the respective power-line cords 220 for the transmission of both the electric power and power control commands can simplify maintenance of the data storage sub-system 120. It is further contemplated that in at least some non-limiting embodiments of the present technology, the use of the respective power-line cords 220 for the transmission of both of the electric power and the power control commands can help improve the "density" of the data storage sub-system 120, the density being "storage capacity per square foot" of the data storage sub-system 120.

In the non-limiting embodiment illustrated herein, the respective power-line cords 220 are configured for power-line communication (PLC) on the power control network 200.

Generally speaking, PLC is a communication technology using existing power cables for sending data, which allows simultaneously transmitting electric power and sending data on the existing power cable, e.g. an electronic device may be simultaneously powered-on, be controlled or have data acquired therefrom.

PLC may use different modulation schemes such as Orthogonal Frequency Division Multiplexing (OFDM), Binary Phase Shift Keying (BPSK), Frequency Shift Keying (FSK), Spread-FSK (S-FSK), for example.

In the context of the present technology, PLC allows transmission of electric power and power control commands on the respective power-line cords 220.

The power supply module 122, the power management module 124, and each given storage enclosure 260 of the one or more pluralities of storage enclosures 126 include a respective PLC modem 280. The respective PLC modems 280 are configured transmit and relay power control commands and responses thereto by modulating voltage on the power-line cords 220.

The respective power-line cords 220 are configured to transmit power originating from the power supply module 122 through the data storage sub-system 120. The respective power-line cords 220 connect the power supply module 122, the power management module 124, and the one or more pluralities of storage enclosures 126 to form a power transmission channel.

The respective power-line cords 220 are configured to transmit power control commands through the data storage sub-system 120. The respective power-line cords 220 connect the respective PLC modems 280 of the power supply module 122, the power management module 124, and each given storage enclosure 260 in the one or more pluralities of storage enclosures 126 to form a power control commands channel. The power control commands channel is a shared transmission media, where information is shared from a logical perspective in the data storage sub-system 120. The shared transmission media is a shared bus on the power control network 200, to which the respective PLC modems 280 of the power supply module 122, the power management module 124, and each of the one or more pluralities of storage enclosures 126 are connected. Thus, each of the respective PLC modems 280 has access to the power control commands and the responses to the power control commands transmitted over the power control channel of the source wires (not separately numbered) in the respective power-line cords 220.

It should be noted that a higher-level logic of the power control network 200, as well as power orchestration inside individual components of the power control network 200 can be implemented using commodity microcontrollers with custom firmware and will not be discussed herein in more detail for the purpose of the present specification.

Power Supply Module

The power supply module 122 is configured to provide electric power to activate the one or more pluralities of storage enclosures 126 of the data storage sub-system 120.

How the power supply module 122 is configured to provide power to the one or more pluralities of storage enclosures 126 is not limited, and its implementation is well known in the art. In the embodiment illustrated herein, the power supply module 122 transmits electrical power in the form of a direct current (DC) as an example.

As a non-limiting example, the power supply module 122 can be implemented as a multi-component device including a power supply (such as Scout DC Power System available from Newmar Power of 15272 Newsboy Circle, Huntington Beach, Calif. 92649, United States of America), a PLC-modem (such as RS485 PLC Industrial Modem 220-240V at 50/60 Hz available from Basic Micro of United Kingdom), a controller (such as one available from Raspberry Pi), and communication interfaces (such as an Ethernet port and the like).

The power supply module 122 is under control of the power management module 124, which causes the power supply module 122 to selectively provide power to activate a given storage enclosure 260 of the one or more pluralities of storage enclosures 126.

More specifically, the power supply module 122 has a plurality of output power supply connectors 320 to which the respective power-line cords 220 of each of the one or more pluralities of storage enclosures 126 are connected. The power supply module 122 provides power to each of the storage enclosures 126 via the plurality of output power supply connectors 320 (provided the given one of the plurality of output power supply connectors 320 is activated). Each of the plurality of output power supply connectors 320 can be selectively: switched on to transmit power to a corresponding plurality of storage enclosures of the one or more pluralities of storage enclosures 126, or switched off to stop transmission of power to the corresponding plurality of storage enclosures of the one or more pluralities of storage enclosures 126.

In some non-limiting embodiments of the present technology, the power supply module 122 is located in a separate physical location from at least one of the power management module 124 and the one or more pluralities of storage enclosures 126. In other non-limiting embodiments of the present technology the power supply module 122 may be located in the same physical location as the power management module 124 and the one or more pluralities of storage enclosures 126. In some non-limiting embodiments of the present technology, the power supply module 122 is located physically externally relative to the one or more pluralities of storage enclosures 126. In other words, in some non-limiting embodiments of the present technology, the power supply module 122 is located outside an outer perimeter of the one or more pluralities of storage enclosures 126. In some non-limiting embodiments of the present technology, the physical placement of the power supply module 122 can help improve the "density" of the data storage sub-system 120.

It should be noted that the power supply module 122 can be the only component in the data storage sub-system 120 from where electrical power originates. In alternative non-limiting embodiments of the present technology, it is envisioned that at least some of the various components of the system 100 can have independent and separate power supplied in addition to and similar to the power supply module 122.

Power Management Module

The power management module 124 is configured to control the power supply module 122 to selectively provide power to activate a given plurality of storage enclosures of the one or more pluralities of storage enclosures 126 on the power control network 200 in response to client requests from the one or more storage control processors 110. As a non-limiting example, the one or more storage control processors 110 may request the power management module 124 to activate or deactivate a specific disk storage (not depicted) in a specific enclosure of the one or more pluralities of storage enclosures 126. It is contemplated that in some non-limiting embodiments of the present technology, the power management module 124 may be configured to manage transmission of electric power to disk storages inside the one or more storage enclosures 126 in the data storage sub-system 120.

In some non-limiting embodiments of the present technology, the power management module 124 has a processor (not depicted) connected to a memory (not depicted) for storing computer-readable instructions. As a non-limiting example, the power management module 124 can be implemented as multi-component device including a PLC-modem (such as RS485 PLC Industrial Modem 220-240V at 50/60 Hz available from Basic Micro of United Kingdom), a controller (such as one available from Raspberry Pi), and communication interfaces (such as an Ethernet port and the like).

It should be noted that in the embodiment illustrated herein, the power management module 124 receives electrical power from a separate power supply unit (not depicted). However, in alternative non-limiting embodiments of the present technology, the power management module 124 could receive electrical power from the power supply module 122.

In some non-limiting embodiments of the present technology, the power management module 124 has access to the memory (not depicted) for storing and retrieving information about:
- the power supply module 122 such as: a number of the plurality of output power supply connectors 320, electric power values such as frequency, voltage supplied from each of the plurality of output power supply connectors 320, and threshold values of electric power that may be supplied via each of the plurality of output power supply connectors 320, and the like.
- a given plurality of storage enclosures of the one or more pluralities of storage enclosures 126, such as: addresses of storage enclosures in the given plurality of storage enclosures, electrical power values of the storage enclosures, number of respective disk storages in the storage enclosures, addresses of each of the disk storages in the storage enclosures, type of each disk storage, read or write speed of each disk storage, electric power values of each the disk storages, and the like.

The power management module 124 is connected to a third output power supply connector (not numbered) of the power supply module 122 via a first power-line cord 230 exclusively for communication purposes. The power management module 124 does not consume electrical power from the power supply module 122, and the power supply module 122 is configured to filter out low-frequency harmonics in voltage transmitted to the power management module 124 via the third output power supply connector (not numbered), such that only high-frequency harmonics used for encoding power control commands remain. Thus it can be said that the power management module 124 and the power supply module 122 share an exclusive communication protocol on the power control channel of the first power-line cord 230, which does not require explicit addressing, i.e. no other component of the power control network 200 can accept power control-commands transmitted between the power management module 124 and the power supply module 122.

The power management module 124 is configured to communicate with the one or more pluralities of storage enclosures 126 over the power control network 200 by addressing specifically a given storage enclosure 260 of the one or more pluralities of storage enclosures 126, after execution of an enclosure discovery procedure, which will be described in more detail herein below with reference to FIG. 5.

How the power management module 124 is configured to control the power supply module 122 to selectively provide power to the one or more pluralities of storage enclosures 126 will be described in more detail herein below with reference to FIG. 4.

In the context of the present technology, the power management module 124, under the control of the one or more storage control processors 110, is configured to cause the data storage sub-system 120 to operate below, or equal to, a total power consumption threshold. The total power consumption threshold may be determined by operators of the present technology, for example.

It is contemplated that components of the data storage sub-system 120, such as a number of disk storages in a given storage enclosure and/or a number of the one or more pluralities of storage enclosures 126 may be configured based on the total power consumption threshold.

The total power consumption threshold includes a total power budget such that the disk storage system provides a guaranteed bandwidth for executing client requests for each moment in time.

The total power budget threshold includes a read bandwidth threshold, and a write bandwidth threshold. In other words, the total power budget comprises a portion that is dedicated for the write operations. This can be thought of as a guaranteed (fixed) bandwidth for write tasks (the bandwidths being associated with the speed of executing write tasks). The remainder of the total power budget can be dedicated to read operations. However, if at a given point in time there are no read operations to be executed, the remainder of the total power budget can be dynamically re-assigned to the write operations.

Storage Enclosures

A given storage enclosure 260 (FIG. 3) of the one or more pluralities of storage enclosures 126 is configured to: (i) receive power originating from the power supply module 122 over the power control network 200, which causes activation of the given storage enclosure 260; (ii) receive power control commands originating from the power management module 124, and transmit responses to the power control commands over the power control network 200; (iii) hold a respective set of disk storages 290; (iv) transmit power to another given storage enclosure (not numbered); (v) provide power to the respective set of disk storages 290; and (vi) execute client requests directed to given disk storage 292 in the respective set of disk storages 290.

It should be noted that all the respective sets of disk storages 290 of the storage enclosures 126 form together a plurality of disk storages. Thus it can be said that data storage sub-system 120 has a plurality of disk storages (not numbered), divided among the storage enclosures 126 in respective sets of disk storages 290.

As stated herein above, electric power in the data storage sub-system 120 originates from the power supply module 122, and the given storage enclosure 260 does not have a respective power supply unit.

The given storage enclosure 260 is configured to receive power to be activated only in response to a sequentially connected storage enclosure being active, i.e. power originating from the power supply module 122 can be transmitted to the given storage enclosure 260 only if all of the prior-sequentially connected storage enclosures is already powered-on, which allows the sequentially connected storage enclosure to relay the power from the power supply module 122 to the given storage enclosure 260. What prior-sequentially connected means will be explained in more detail herein below.

The given storage enclosure 260 is also configured to transmit power originating from the power supply module 122 and destined to another given storage enclosure (not depicted) in the one or more pluralities of storage enclosures 126 upon receiving a request from the power management module 124. To transmit the electric power, the given storage enclosure 260 has an output enclosure connector (not depicted) connected to the respective power-line cord 220 of the other given storage enclosure (not depicted), which can be selectively switched by the power management module 124. The given storage enclosure 260 is the prior-sequentially connected storage enclosure to the other given storage enclosure.

The given storage enclosure 260 is also configured to transmit power to activate the given disk storage 292 of the respective set of disk storages 290 contained in the given storage enclosure 260.

Generally speaking, the given storage enclosure 260 of the one or more pluralities of storage enclosures 126 is a physical chassis structured and dimensioned to receive the respective set of disk storages 290. A number of disk storages contained in the respective set of disk storages 290 is not limited and can be different in various non-limiting embodiments of the present technology.

In some non-limiting embodiments of the present technology, the given storage enclosure 260 includes and operates simultaneously with various types of disk storages in the respective set of disk storages 290.

Disk Storages

The given disk storage 292 in the respective set of disk storages 290 is configured to write and store data, and retrieve stored data contained therein in response to request from the one or more storage control processors 110. The given disk storage is a computer usable information storage medium in the form of a disk adapted to operate in the data storage sub-system 120.

In some non-limiting embodiments of the present technology, the given disk storage 292 may be implemented as a hard disk drive (HDD) including a Serial-Attached SCSI (SAS) HDD, a Serial Advanced Technology Attachment (SATA) HDD, and a Near Line SAS (NL-SAS) HDD. In other non-limiting embodiments of the present technology, the given disk storage 292 may be implemented as a solid-state drive (SDD) including a SAS SSD, and a NVM Express (NVMe) SSD.

Figure 4:
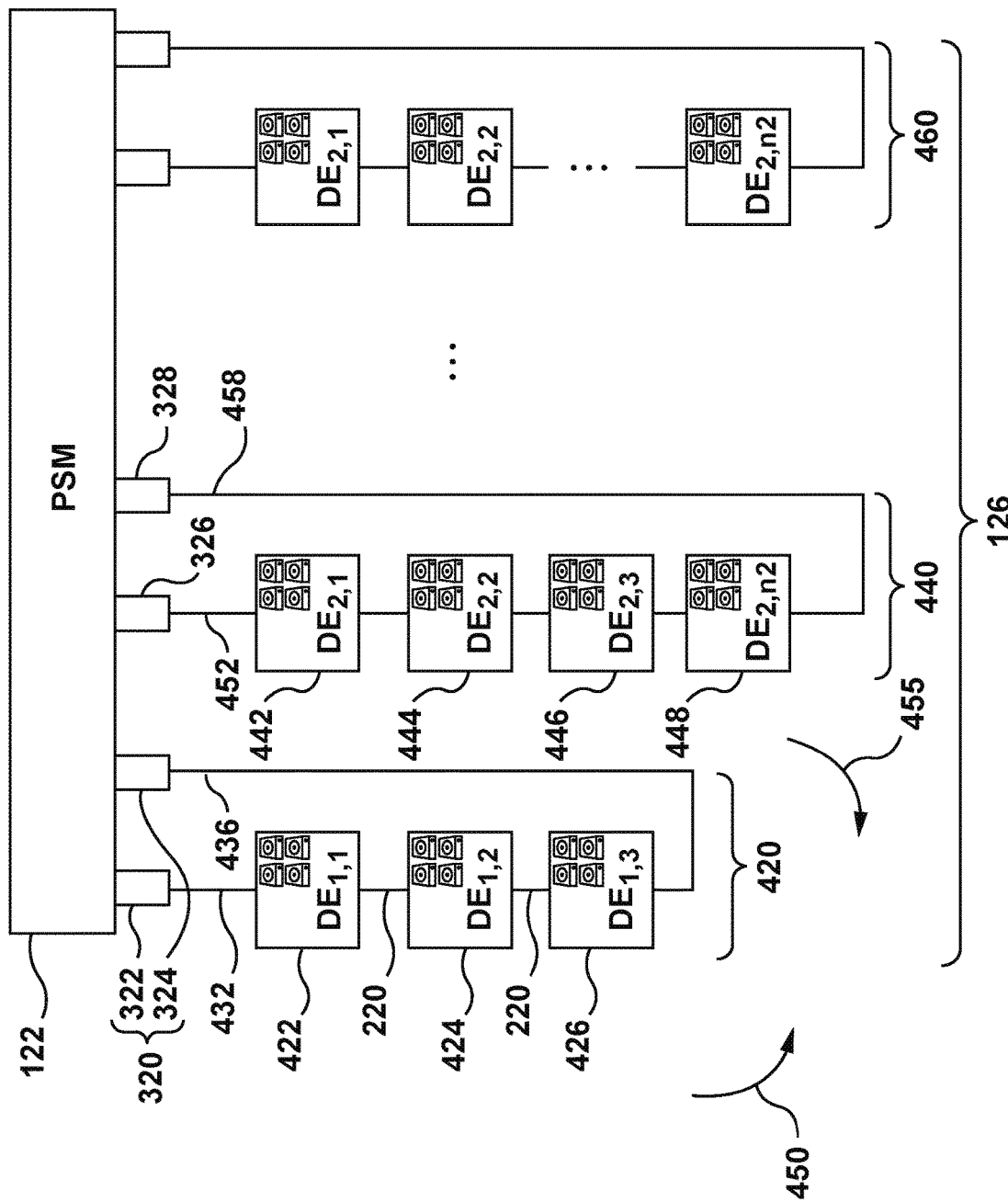
FIG. 4 depicts a schematic representation of a plurality of storage enclosures connected to the power supply module of FIG. 2 in accordance with non-limiting embodiments of the present technology.

Now turning to FIG. 4, there is depicted a schematic diagram of the one or more pluralities of storage enclosures 126 connected to the power supply module 122 in accordance with non-limiting embodiments of the present technology.

The one or more pluralities of storage enclosures 126 include a first plurality of storage enclosures 420, a second plurality of storage enclosures 440, and a third plurality of storage enclosures 460.

It should be noted that one or more pluralities of storage enclosures 126 may be a single plurality of storage enclosures, such as one of the first plurality of storage enclosures 420, the second plurality of storage enclosures 440, and the third plurality of storage enclosures 460.

It should also be noted that in the embodiment illustrated in FIG. 4, a number of storage enclosures in each of the first plurality of storage enclosures 420, the second plurality of storage enclosures 440, and a third plurality of storage enclosures 460 is different for illustrative purposes. It is contemplated that each the first plurality of storage enclosures 420, the second plurality of storage enclosures 440, and a third plurality of storage enclosures 460 may have the same number of storage enclosures, or a different number of storage enclosures, depending on factors such as the total power consumption threshold of the data storage sub-system 120 for example.

How the one or more pluralities of storage enclosures 126 are configured will now be described with reference to the first plurality of storage enclosures 420. It should be understood that the second plurality of storage enclosures 440, and the third plurality of storage enclosures 460 are configured similarly.

Generally speaking, the first plurality of storage enclosures 420 is connected in a daisy-chain arrangement to the plurality of output power supply connectors 320 of the power supply module 122. A daisy-chain arrangement is an arrangement where storage enclosures are connected to each other in series via respective power-line cords 220 to form a loop.

The first plurality of storage enclosures 420 includes a first storage enclosure 422 connected downstream 450 from the power supply module 122, via a first power supply connector 432 that is connected to the first output power supply connector 322 of the power supply module 122. By the same token, a third storage enclosure 426 is connected upstream 455 from the power supply module 122 via a second power supply connector 436 that is connected to the second output power supply connector 324 of the power supply module 122, and a second storage enclosure 424 is connected between the first storage enclosure 422 and the third storage enclosure 426. It can be said that the second storage enclosure 424 is connected downstream 450 from the first storage enclosure 422, or upstream 455 from the third storage enclosure 426.

As used herein, downstream 450 means an anti-clockwise direction in the daisy-chain arrangement, while upstream 455 means a clockwise direction in the daisy-chain arrangement. However, as will be described herein below, it can be said that from the power supply module 122 perspective, the second storage enclosure 424 is connected functionally downstream from both the first storage enclosure 422 and the third storage enclosure 426. Given the daisy-chain arrangement described above, the "functionally downstream" is a term that is used to denote ability to receive electric power supply. In the illustrative example, the second storage enclosure 424 can receive power selectively from either one of (depending on which one is active/not broken):

the first storage enclosure 422 and the third storage enclosure 426. It should be also noted that if both the first storage enclosure 422 and the third storage enclosure 426 are active, they form a power loop. In accordance with some of the non-limiting embodiments of the present technology, the technical effect of this arrangement may include fault tolerance in the data storage sub-system 120 by ensuring provision of power to the second storage enclosure 424 if one of the first output power supply connector 322 and the second output power supply connector 324 becomes faulty. By the same token, from the sequential power receiving perspective, the second storage enclosure 424 is connected functionally upstream from both the first storage enclosure 422 and the third storage enclosure 426.

As stated herein above, a given storage enclosure in the first plurality of storage enclosures 420, i.e. the second storage enclosure 424, can only be activated by receiving power originating from the power supply module 122 only if a prior-sequential storage enclosure is active. As should be apparent now, for the second storage enclosure 424, the prior-sequential active storage enclosure can be either the first storage enclosure 422 (in the counter-clockwise direction of power supply) or the third storage enclosure 426 (in the clockwise direction of power supply).

By the same token, the second plurality of storage enclosures 440 are serially connected to form a daisy-chain arrangement, and include four storage enclosures: a first storage enclosure 442 connected downstream from the power supply module 122 via a third power supply connector 452 that is connected to the third output power supply connector 326 of the power supply module 122, a second storage enclosure 444 connected downstream 450 from the first storage enclosure 442, a third storage enclosure 446 connected downstream 450 from second storage enclosure 444, and a fourth storage enclosure 448 connected downstream 450 from the third storage enclosure 446 and connected upstream 455 from the power supply module 122 via a fourth power supply connector 458 that is connected to the fourth output power supply connector 328 of the power supply module 122.

As stated herein above, a given storage enclosure in the second plurality of storage enclosures 440, e.g. one of the second storage enclosure 444 or the third storage enclosure 446, can be activated by receiving power originating from the power supply module 122 only if a prior-sequential storage enclosure connected downstream 450 or upstream 455 is active. As a first non-limiting example, the second storage enclosure 444 can receive power to be activated only if: the first storage enclosure 442 is active, or each of the third storage enclosure 446 and the fourth storage enclosure 448 are active. As a second non-limiting example, the third storage enclosure 446 can receive power to be activated only if: each of the first storage enclosure 442 and the second storage enclosure 444 are active, or if the fourth storage enclosure 448 is active. In other words, a given storage enclosure in a plurality of storage enclosures connected in a daisy-chain can only be activated if all prior-sequential storage enclosures (i.e. up to the power supply module 122) downstream 450 from or upstream 455 from the given storage enclosure are active.

Now turning to FIG. 5, there is depicted a diagram of a communication flow of an enclosure discovery procedure 500 in accordance with non-limiting embodiments of the present technology.

The communication flow of the enclosure discovery procedure 500 is depicted from the point of view of the power control commands channel.

Enclosure Discovery Procedure

The enclosure discovery procedure 500 is executed by the power management module 124 upon initialization or re-initialization of the data storage sub-system 120.

In some non-limiting embodiments of the present technology, the power management module 124 has access to computer readable instructions in a memory, the computer-readable instructions, upon being executed cause the processor (not depicted) of the power management module 124 to execute the enclosure discovery procedure 500.

The purpose of the enclosure discovery procedure 500 is to: (i) acquire configuration data of the data storage sub-system 120; (ii) validate that a current configuration of the data storage sub-system 120 matches the acquired configuration data; and (iii) assign logical addresses to components of the data storage sub-system 120.

As stated herein above, the power management module 124 has access to a volatile or non-volatile memory for retrieving information about resources that must be available to the data storage sub-system 120.

The power management module 124 transmits a first power control command 512 via the first power-line cord 230 to the power supply module 122 to switch on the first output power supply connector 322, the first output power supply connector 322 being connected to the respective power-line cord 220 of the first plurality of storage enclosures 420. The first power control command 512 causes the power supply module 122 to provide electric power to the first storage enclosure 422.

The first storage enclosure 422 receives the electric power and is activated. In response to the first power control command 512, the first storage enclosure 422 transmits a first response power control command 514 to the power management module 124 to confirm it has been activated.

The power management module 124 receives the first response power control command 514 and assigns a first enclosure address to the first storage enclosure 422.

The power management module 124 transmits a second power control command 522 to the first storage enclosure 422 using the first enclosure address to activate the second storage enclosure 424 of the first plurality of storage enclosures 420.

The second storage enclosure 424 receives the electric power via the first storage enclosure 422 and is activated. The second storage enclosure 424 transmits a second response power control command 524 to the power management module 124 to confirm it has been activated.

The power management module 124 receives the second response power control command 524 and assigns a second enclosure address to the second storage enclosure 424.

The power management module 124 transmits a third power control command 532 to the second storage enclosure 424 via the first storage enclosure 422 using the second enclosure address to activate the third storage enclosure 426 of the first plurality of storage enclosures 420.

The third storage enclosure 426 receives the electric power via the first storage enclosure 422 and the second storage enclosure 424 and is activated. The third storage enclosure 426 transmits a third response power control command 534 to the power management module 124.

The power management module 124 receives the third response power control command 534 and assigns a third enclosure address to the third storage enclosure 426.

The power management module 124 can now communicate directly with each of the first storage enclosure 422, the second storage enclosure 424 and the third storage enclosure 426 of the first plurality of storage enclosures 420 by using the first enclosure address, the second enclosure address, and the third enclosure address respectively on the power control commands channel of the respective power-line cords 220.

In some non-limiting embodiments of the present technology, the power management module 124 transmits a fourth power control command 536 to the power supply module 122 to switch on the second output power supply connector 324. The third storage enclosure 426 may respond with fourth response power control command 538, which confirms operation of the second output power supply connector 324.

The second output power supply connector 324 safeguards the first plurality of storage enclosures in case of failure of the first output power supply connector 322.

The power management module 124 repeats the procedure with the second plurality of storage enclosures 440, and the third plurality of storage enclosures 460.

In some non-limiting embodiments of the present technology, the enclosure discovery procedure 500 may be implemented by the following pseudocode executed by the power management module 124:

1. //PSM: power supply module, MM: power management module
2. Read from the configuration data of the data storage system the following parameters:
    the expected number of the plurality of output power supply module (PSM) connectors
    for each expected connector read whether a daisy chain of enclosures is expected on that connector; if yes, read the expected number of enclosures in that chain
3. Compose a list of output PSM connectors that are expected to have enclosures attached to them: connectors_list
4. for each connector in connectors_list:
5. PSM_power_on_connector(connector)
6. is_received=wait_for_response_from_enclosure(time_to_wait)
7. if is_received==false:
8. Discovered configuration doesn't match the description
    The discovery process failed
9. address=get_enclosure_free_address( )
10. ENCLOSURE_assign_address(address)
11. found_next_enclosure=true
12. while found_next_enclosure==true
13. found_next_enclosure=false
14. ENCLOSURE_power_on_next(address)
15. is_received=wait_for_response_from_the_enclosure (time_to_wait)
16. if is_received==false:
17. if we expected the response:
18. Discovered configuration doesn't match the description
    The discovery process failed
19. else:
20. if we didn't expect the response:
21. Discovered configuration doesn't match the description
    The discovery process failed
22. found_next_enclosure=true
23. Using the configuration description, calculate address of a redundant connector for the current daisy chain of enclosures: redundant_connector
24. PSM_power_on_connector(redundant_connector)

Thus, the enclosure discovery procedure 500 may be executed by using the four interfaces implemented by the power supply module 122, the power management module 124, and the one or more pluralities of storage enclosures 126, where PSM_power_on_connector(connector)—request the PSM to power-on an output PSM connector whose address is given in the connector argument wait_for_response_from_enclosure(time_to_wait)—listen the power control channel 'bus' for a time_to_wait period of time or until a "powered-on" notification is received. Return 'true' if the notification was received. Return 'false' in the opposite case ENCLOSURE_assign_address(address)—a command that can be sent by MM to the power control network. Any enclosure that is listening to the power control channel 'bus' and doesn't have an address assigned should learn that from now on it has address as its address in the power control network. When MM sends this command, it expects that exactly one enclosure waits for the address to be assigned ENCLOSURE_power_on_next(address)—a command intended for an enclosure whose address is address. The corresponding enclosure should switch-on its output power supply connector (thus powering-on the next enclosure in the daisy chain)

During the enclosure discovery procedure 500, the power management module 124 transmits power control commands to the power supply module 122 and enclosures in the one or more pluralities of storage enclosures 126. Thus, based on the configuration retrieved from the memory (not depicted), the power management module 124 may or may not receive responses to the power control commands. If the power management module 124 receives an unexpected power control command response, or does not receive a power control command response when a response is expected, the enclosure discovery procedure 500 interrupts, and the data storage sub-system 120 is put offline, until misconfiguration issues are fixed by operators of the present technology.

Fault Tolerance

Generally speaking, the daisy-chain arrangement of the first plurality of storage enclosures 420 forming a loop tolerates two types of failures: (i) if one of the first power supply connector 432 and the second power supply connector 436 or one of the first output power supply connector 322 and the second output power supply connector 324 fails, power supply to the first plurality of storage enclosures 420 is still guaranteed; and (ii) if one or more power-line cords in the first plurality of storage enclosures 420 fail, enclosures in the first plurality of storage enclosures 420 may still function as long there is a chain of functioning power-line cords from the enclosures to the power supply module 122.

It should be noted that it may be beneficial to have more than one plurality of storage enclosures that are connected in a daisy chain arrangement in the data storage sub-system 120. It is contemplated that having multiple daisy-chains (such as the first plurality of storage enclosures 420, the second plurality of storage enclosures 440, and the third plurality of storage enclosures 460) makes the failure domain of the data storage sub-system 120 larger, and more fault-tolerant in general, as malfunction of components in one daisy-chain arrangement (e.g. the first plurality of storage enclosures 420) does not affect component in other daisy-chain arrangements (e.g. the second plurality of storage enclosures 440). Further, a given output power supply connector of plurality of output power supply connectors 320, has a maximum allowed current capacity (i.e. a current threshold), that can be carried thereon to ensure optimal functionality. Thus, as a result of the current threshold, having a high number of storage enclosures in a single daisy chain may not allow satisfying power requirements of all storage enclosures in the single daisy chain.

Interfaces

It may now be apparent that electric power in the data storage sub-system 120 is supplied through the power control network 200 in a hierarchical manner via three different interfaces A first interface for transmission of power between the power supply module 122 and a given plurality of storage enclosures of the one or more pluralities of storage enclosures 126, by selectively switching one of the plurality of output power supply connectors 320. As a non-limiting example, for the first plurality of storage enclosures 420, the power supply module 122 has the first output power supply connector 322, which corresponds or connects to the first power supply connector 432 of the first storage enclosure 422 of the first plurality of storage enclosures 420. The first interface allows to selectively switch the first output power supply connector 322 of the power supply module 122, which connects the power supply module 122 to the first storage enclosure 422 to provide power thereto.

A respective second interface for transmission of power between storage enclosures in a given plurality of storage enclosures of the one or more pluralities of storage enclosures 126. As stated above, a storage enclosure in the first plurality of storage enclosures 420 can only be activated if a prior-sequential storage enclosure is active. Thus, the second storage enclosure 424 connected to the first storage enclosure 422 in the first plurality of storage enclosures 420 can be activated only if the first storage enclosure 422 is active, and if the first storage enclosure 422 has received a power control command from the power management module 124 to transmit power to activate the second storage enclosure 424. To activate a storage enclosure connected to prior-sequential active storage enclosure in the given plurality of storage enclosures, the power management module 124 has to explicitly request the prior-sequential active storage enclosure to transmit power functionally downstream to the consecutive storage enclosure by using the address of the prior-sequential active storage enclosure.

A respective third interface for transmission of electric power between the given storage enclosure 260 and the given disk storage 292 in the respective set of disk storages 290 contained therein.

In a sense, a given disk storage 292 located inside a given storage enclosure 260 in a plurality of storage enclosures can only be activated if the given storage enclosure 260 is active. The given storage enclosure 260 in the plurality of storage enclosures can be activated only if all storage enclosures functionally upstream from the given storage enclosure are active. One of the storage enclosures connecting to the power supply module 122 can be activated only if the corresponding output power supply connector on the power supply module 122 has been switched on.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A data storage system comprising:
a power supply module;
a plurality of serially connected storage enclosures,
a given storage enclosure of the plurality of serially connected storage enclosures including at least one disk storage,
a first storage enclosure of the plurality of serially connected storage enclosures being connected to the power supply module;
a power management module connected to the power supply module,
the power management module being configured to selectively cause the power supply module to transmit electric power to activate the first storage enclosure,
the power management module being further configured to selectively cause the power supply module to transmit the electric power to activate a second storage enclosure of the plurality of serially connected storage enclosures,
the second storage enclosure being connected downstream from the first storage enclosure,
the second storage enclosure being configured to selectively receive power from the power supply module in response to the first storage enclosure being active.

2. The data storage system of claim 1, wherein
the power management module is configured to selectively cause the power supply module to transmit electric power to activate a third storage enclosure of the plurality of serially connected storage enclosures, the third storage enclosure being connected downstream from the second storage enclosure; and wherein
the third storage enclosure is configured to selectively receive power from the power supply module in response to the second storage enclosure being active.

3. The data storage system of claim 2, wherein
the third storage enclosure is connected to the power supply module such that the plurality of serially connected storage enclosures form a loop; wherein
the power management module is configured to selectively cause the power supply module to transmit electric power to activate the third storage enclosure; and wherein
the second storage enclosure is further configured to selectively receive power from the power supply module in response to the third storage enclosure being active.

4. The data storage system of claim 3, wherein
the first storage enclosure is configured to selectively receive power from the power supply module via the third storage enclosure in response to a connection failure between the first storage enclosure and the power supply module.

5. The data storage system of claim 4, wherein
the second storage enclosure is a set of serially connected storage enclosures;
the power management module is configured to selectively cause the power supply module to transmit electric power to activate a given storage enclosure of the set of serially connected storage enclosures;
the given storage enclosure of the multiple serially connected storage enclosures is configured to selectively receive power from the power supply only in response to a totality of storage enclosures connected between the power supply module and the given storage enclosure of the set of serially connected storage enclosures being active.

6. The data storage system of claim 5, wherein
the power management module, the power supply module, and the plurality of serially connected storage enclosures are connected via respective power-line cords.

7. The data storage system of claim 6, wherein the respective power-line cords include a power control commands channel and an electric power transmission channel.

8. The data storage system of claim 7, wherein the power management module, the power supply module, and each of the plurality of serially connected storage enclosures include respective power-line modems for transmitting power control commands on the power control commands channel of the respective power-line cords.

9. The data storage system of claim 8, wherein
the first storage enclosure is further configured to:
transmit the electric power in response to receiving a respective power control command on the power control commands channel from the power management module; and wherein
the second storage enclosure is further configured to:
transmit the electric power in response to receiving a respective power control command on the power control commands channel from the power management module.

10. The data storage system of claim 9, wherein the respective power-line modems of the plurality of serially connected storage enclosures are configured to exclusively transmit responses to power control commands originating from the power-line modem of the power management module.

11. The data storage system of claim 10, wherein the respective power-line modems are configured to transmit the responses to power control commands by modulating a voltage.

12. The data storage system of claim 9, wherein the power control commands channel is a serial bus on the power-line cords.

13. The data storage system of claim 8, wherein the respective power-line cord between the power management module and the power supply module is configured for transmission of power control commands exclusively.

14. The data storage system of claim 11, wherein the given storage enclosure of the plurality of serially connected storage enclosures is configured to activate at least one of the least one disk storage upon receiving a power control command from the management module.

15. A data storage system comprising:
a power supply module;
a plurality of serially connected storage enclosures,
a given storage enclosure of the plurality of serially connected storage enclosures including at least one disk storage,
a first storage enclosure of the plurality of serially connected storage enclosures being connected to the power supply module;
a power management module connected to the power supply module,
the power management module being configured to selectively cause the power supply module to transmit electric power to activate the first storage enclosure,
the power management module being further configured to selectively cause the first storage enclosure to transmit the electric power to activate a second storage enclosure of the plurality of serially connected storage enclosures,
the second storage enclosure being connected downstream from the first storage enclosure.

16. The data storage system of claim 15, wherein
the power management module is configured to selectively cause the second storage enclosure to transmit the electric power to activate a third storage enclosure of the plurality of serially connected storage enclosures, the third storage enclosure being connected downstream from the second storage enclosure.

17. The data storage system of claim 16, wherein
the first storage enclosure can transmit the electric power only if it is active; and wherein
the second storage enclosure can transmit the electric power only if is active.

18. A data storage system comprising:
a power supply module, the power supply module including a first output power supply connector;
a power management module connected to the power supply module,
the power management module being configured to selectively switch the first output power supply connector to cause the power supply module to transmit electric power; and
a plurality of serially connected storage enclosures, the plurality of serially connected storage enclosures including:
a first storage enclosure connected to the first output power supply connector of the power supply module, the first storage enclosure being configured to transmit the electric power to a given storage enclosure in response to a first request from the power management module; and
the given storage enclosure, the given storage enclosure including a respective set of disk storages, the given storage enclosure being connected downstream from the first storage enclosure, the given storage enclosure being configured to transmit the electric power to activate a first disk storage of the set of disk storages in response to a second request from the power management module.

19. The data storage system of claim 18, wherein
the first storage enclosure is configured to transmit the electric power to a second storage enclosure upon receiving a third request from the power management module; and wherein the second storage enclosure is configured to transmit the electric power to a third storage enclosure upon receiving a fourth request.

20. The data storage system of claim 18, wherein the data storage system is connected to a storage processor; and wherein the power management module is configured to selectively switch the first output power supply connector to provide the electric power to the first storage enclosure in response to a request from the storage processor.

* * * * *